United States Patent [19]

McIver et al.

[11] Patent Number: 5,587,906
[45] Date of Patent: Dec. 24, 1996

[54] METHOD AND APPARATUS FOR SENSING A VEHICLE CRASH CONDITION USING VELOCITY ENHANCED ACCELERATION CRASH METRICS

[75] Inventors: George W. McIver, Redondo Beach; Mark A. Carlin, Hermosa Beach, both of Calif.; James E. Bormann, LaPorte, Ind.; Ronald A. Muckley, Milford; Roger A. McCurdy, Troy, both of Mich.

[73] Assignee: TRW Inc., Lyndhurst, Ohio

[21] Appl. No.: 258,952

[22] Filed: Jun. 13, 1994

[51] Int. Cl.⁶ ..................................................... B60R 21/32
[52] U.S. Cl. ................................... 364/424.045; 340/436; 307/10.1; 280/735; 180/282
[58] Field of Search .................... 364/424.05; 340/436, 340/669; 280/734, 735; 180/274, 282; 307/10.1

[56] References Cited

U.S. PATENT DOCUMENTS

| | | | |
|---|---|---|---|
| 4,346,914 | 8/1982 | Livers et al. | 280/735 |
| 4,410,875 | 10/1983 | Spies et al. | 280/735 |
| 4,638,179 | 1/1987 | Mattes et al. | 307/10.1 |
| 4,994,972 | 2/1991 | Diller | 364/424.05 |
| 5,014,810 | 5/1991 | Mattes et al. | 180/268 |
| 5,036,467 | 7/1991 | Blackburn et al. | 364/424.05 |
| 5,040,118 | 8/1991 | Diller | 364/424.05 |
| 5,067,745 | 11/1991 | Yoshikawa | 280/735 |
| 5,068,793 | 11/1991 | Condne et al. | 364/424.05 |
| 5,109,341 | 4/1992 | Blackburn et al. | 364/424.05 |
| 5,157,268 | 10/1992 | Spies et al. | 307/10.1 |
| 5,216,607 | 6/1993 | Diller et al. | 364/424.05 |
| 5,256,904 | 10/1993 | Tohbaru | 364/424.05 |
| 5,337,238 | 8/1994 | Giontsos et al. | 364/424.05 |
| 5,339,242 | 8/1994 | Reid et al. | 364/424.05 |
| 5,363,302 | 11/1994 | Allen et al. | 364/424.05 |
| 5,394,326 | 2/1995 | Liu | 364/424.05 |

FOREIGN PATENT DOCUMENTS 0305654  5/1988  European Pat. Off. .

*Primary Examiner*—Kevin J. Teska
*Assistant Examiner*—Tyrone V. Walker
*Attorney, Agent, or Firm*—Tarolli, Sundheim, Covell, Tummino & Szabo

[57] ABSTRACT

An apparatus for sensing a vehicle crash condition includes an accelerometer (20) for sensing a vehicle crash condition and for providing a signal having a characteristic indicative of the vehicle crash condition. A crash velocity determining circuit (74) determines a crash velocity value (78) from the accelerometer. Crash metric determining circuits (80, 82, 94, 96, 104, 108) determine crash metric values functionally related to acceleration. Threshold determining circuits (88, 98, 112) determining associated threshold values functionally related to the determined crash velocity value (78). Comparators (90, 100, 116) compare the determined crash metric values against associated threshold values. A controller (34) provides a control signal to control actuation of a restraining device in response to the comparison. A shape monitoring circuit (120) determines if the shape of the acceleration signal matches a predetermined shape. If the shape matches, the controller provides the control signal.

19 Claims, 5 Drawing Sheets

METHOD AND APPARATUS FOR SENSING A VEHICLE CRASH CONDITION USING VELOCITY ENHANCED ACCELERATION CRASH METRICS

TECHNICAL FIELD

The present invention is directed to a vehicle air bag restraint system and is particularly directed to a method and apparatus for sensing a vehicle crash condition using velocity enhanced acceleration crash metrics.

BACKGROUND OF THE INVENTION

Actuatable passenger restraint systems for vehicles are well known in the art. One particular type of actuatable passenger restraint system includes an inflatable air bag mounted within the passenger compartment of the vehicle. The air bag has an associated, electrically actuatable ignitor, referred to as a squib. Such systems typically include a plurality of inertia sensing devices electrically connected in series with the squib and mounted at various locations in the vehicle for measuring the deceleration of the vehicle. When the inertia sensing devices are subjected to a crash force greater than a predetermined value, the inertia sensing devices each close an associated electrical switch causing an electric current of sufficient magnitude and duration to be passed through the squib to ignite the squib. The squib, when ignited, ignites a combustible gas generating composition and/or pierces a container of pressurized gas, which results in inflation of the air bag.

Many known inertia sensing devices used in actuatable passenger restraint systems are mechanical in nature. Such devices are typically mounted to the vehicle frame and include a pair of mechanically actuatable switch contacts and a resiliently biased weight. The weight is arranged such that when the vehicle decelerates, the weight physically moves relative to its mounting. The greater the amount and duration of the deceleration, the further the weight moves against the bias force. The switch contacts are mounted relative to the biased weight such that, when the weight moves a predetermined distance, the weight moves over or against the switch contacts causing them to close. When the switch contacts of each of the inertia sensors connected in series with the squib close, the squib is connected to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. The transducer provides an electrical signal having a value proportional to the vehicle's deceleration. If the crash sensing system includes only one accelerometer for the purpose of monitoring for a crash event, such a system is referred to in the art as a single point crash sensor system.

The monitoring circuit processes the transducer output signal. The processing of the accelerometer signal in a single point crash sensing system and the determination of whether a deployment crash event is occurring is the subject of several U.S. Patents. Known processing techniques include (i) integration of the acceleration signal to determine crash velocity, (ii) double integration of the acceleration signal to determined crash displacement, (iii) differentiation of the acceleration signal to determine crash jerk, (iv) frequency component monitoring to determine the presence of certain frequency components in the acceleration signal, or (v) determination of crash energy from the acceleration signal. Each of these techniques is referred to in the art as "the crash algorithm" or "the crash metrics." For any particular crash metric used, the determined value is typically compared against a predetermined threshold value. If the threshold value is exceeded or if certain values are determined, a deployment crash event is occurring.

The purpose of crash metrics is to distinguish between a deployment crash condition and a non-deployment crash condition. A non-deployment crash condition is one in which seat belts alone are sufficient to restrain the occupant and one in which deployment of the occupant's air bag will not enhance protection. A deployment crash condition is one in which deployment of the occupant's air bag will enhance protection for the occupant.

It is not desirable to inflate a vehicle air bag upon the occurrence of a non-deployment crash condition. Such needless deployment only increases the expense of repairing the vehicle after the crash event. A major problem that each of the crash metrics of the prior art is concerned with is the discrimination between a deployment crash event and a non-deployment crash event. By way of example, a 8–10 MPH zero degree crash into a barrier is considered a non-deployment crash event and a 14–17 MPH zero degree crash into a barrier is considered a deployment crash event. The actual values used are typically determined by the vehicle manufacturer. The margin between the two different crash events is relatively narrow. Also, other vehicle events occur that may result in an output from the accelerometer such as curb hits, undercarriage snags, etc., for which it is not desirable to deploy the air bag. The crash metrics must be capable of identifying such events as non-deployment events.

Also of concern is deployment timing. It is desirable to not only detect that a deployment crash event is occurring but to detect it early in the crash event so that the air bag deployment is timed to provide the maximum protection.

SUMMARY OF THE INVENTION

In accordance with the present invention, a method and apparatus are provided for sensing a vehicle crash condition using velocity enhanced acceleration crash metrics ("VEAM").

In accordance with one embodiment of the present invention, an apparatus for sensing a vehicle crash condition comprises acceleration sensing means for sensing a vehicle crash condition and for providing a crash acceleration signal having a characteristic indicative of the vehicle crash condition. Crash velocity determining means is connected to the acceleration sensing means for determining a crash velocity value from said crash acceleration signal. Crash metric determining means is connected to the acceleration sensing means for determining a crash metric value functionally related to the acceleration signal. The apparatus further includes threshold determining means for determining a threshold value functionally related to the determined crash velocity value and comparing means for comparing the determined crash metric value against the threshold value and for providing a signal indicative of the comparison. Control signal means provides a control signal in response to the comparing means when the determined crash metric exceeds the threshold value.

In accordance with another embodiment of the present invention, an apparatus is provided for sensing a vehicle crash condition comprising acceleration sensing means for sensing a vehicle crash condition and for providing a crash acceleration signal having a characteristic indicative of the vehicle crash condition. Crash velocity determining means are connected to the acceleration sensing means for determining a crash velocity value from said crash acceleration signal. A plurality of crash metric determining means are connected to the acceleration sensing means. Each crash metric determining means determines a crash metric value functionally related to the crash acceleration signal. The apparatus further comprises a plurality of threshold determining means, each crash metric determining means having an associated threshold determining means. Each threshold determining means determines an associated threshold value functionally related to the determined crash velocity value. Comparing means compares each of the determined crash metric value against its associated threshold value and provides a signal indicative of the comparison. The apparatus further includes control signal means for providing a control signal in response to any of the determined crash metrics exceeding its associated threshold value.

In accordance with yet another embodiment of the present invention, a method is provided for sensing a vehicle crash condition comprising the steps of sensing vehicle crash condition and providing a crash acceleration signal having a characteristic indicative of the vehicle crash deceleration. A crash velocity value is determined from the crash acceleration signal. The method further includes the steps of determining a plurality of crash metric values functionally related to said crash acceleration signal and determining an associated crash threshold value for each crash metric. Each determined threshold value is functionally related to the determined crash velocity value. The method further includes comparing each of the determined crash metric values against its associated threshold value and providing a signal indicative of the comparison. A control signal is provided in response to any of the determined crash metrics exceeding its associated threshold value.

In accordance with still yet another embodiment of the present invention, an apparatus is provided for sensing a vehicle crash condition. The apparatus includes acceleration sensing means for sensing a vehicle crash condition and for providing a crash acceleration signal having a characteristic indicative of the vehicle crash condition. Crash velocity determining means is connected to the acceleration sensing means for determining crash velocity value from the crash acceleration signal. The apparatus further includes crash metric determining means connected to the acceleration sensing means for determining a crash metric value functionally related to the crash acceleration signal wherein the value is indicative of a type of crash event. Control signal means provides a control signal in response to (i) the determined crash velocity value being greater than a predetermined value and (ii) the crash metric value indicating that a deployment crash event is occurring.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
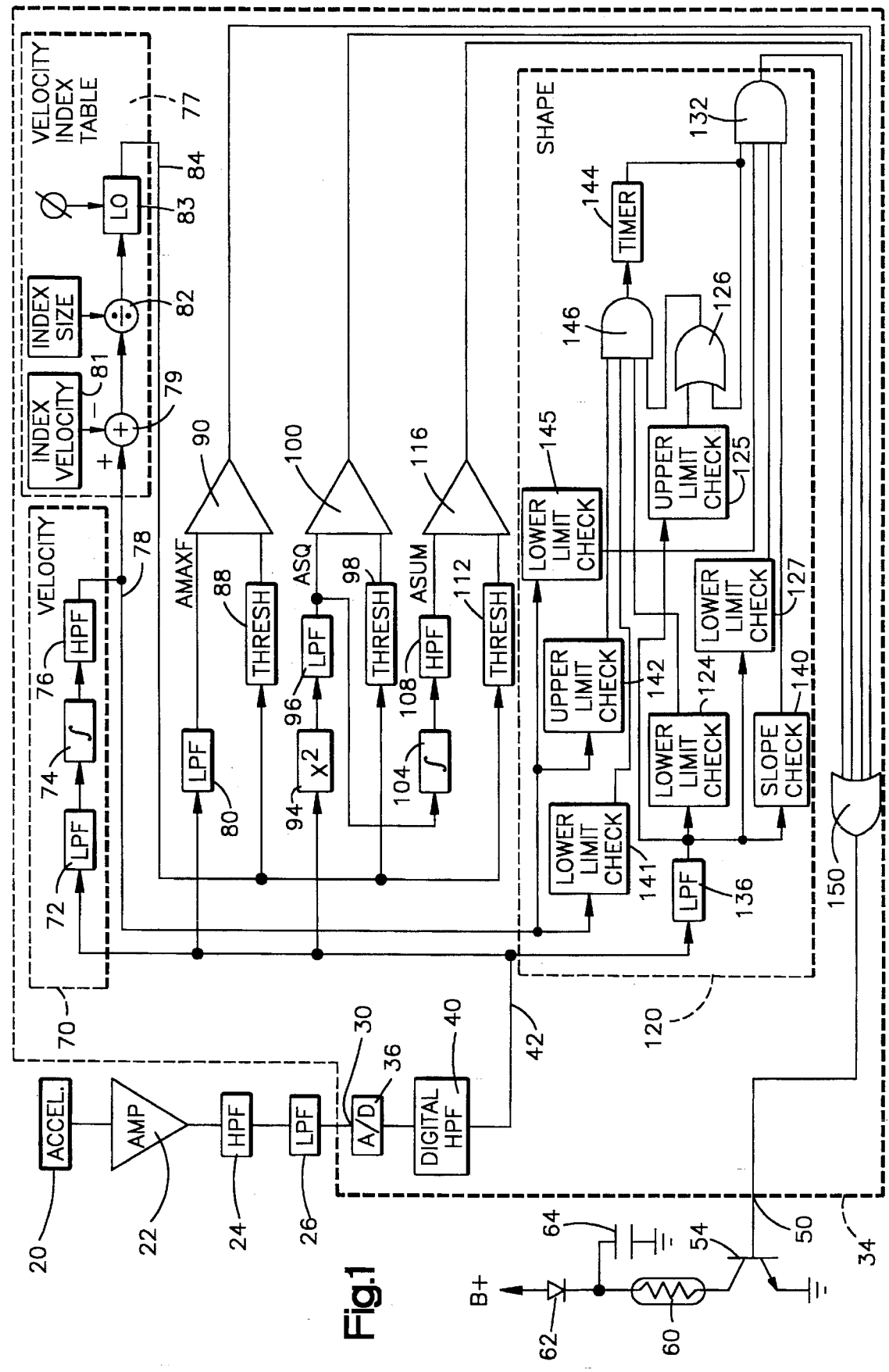
FIG. 1 is a schematic block diagram of an air bag control circuit in accordance with the present invention.

Referring to FIG. 1, a single accelerometer 20 is mounted at a location in the vehicle in a known manner. The accelerometer 20 outputs an electric signal having a characteristic indicative of the deceleration of the vehicle. The output of the accelerometer is connected to an amplifier 22 which amplifies the acceleration signal. The amplifier 22 includes circuitry to, not only amplify the acceleration signal, but to compensate for temperature variations that may occur in the acceleration signal due to variations in the accelerometer.

The output of the amplifier 22 is connected to a series filter network including a high pass filter circuit 24 and low pass filter 26. The high pass filter 24 eliminates any DC drift and offsets in the output of the amplifier 22 resulting from either the accelerometer 20 itself or from the amplifier circuit. The low pass filter 26 functions as an anti-alias filter that limits the bandwidth of the acceleration signal to a desired frequency range and to limit the magnitude of aliased frequency components outside of the passband of interest. Empirical testing is used to establish the frequency range of the relevant crash signals. In accordance with one embodiment of the present invention, the low pass filter 26 is a two pole filter having a 3 db cutoff at 325 Hz.

The output of the low pass filter 26 is connected to an analog-to-digital ("A/D") input 30 of a microcomputer 34. Internal to the microcomputer 34 is an A/D converter 36 which converts the acceleration signal into a digital signal having a value at any given time expressed in counts. The output of the A/D converter 36 is digitally high pass filtered 40 for the purpose of eliminating small drifts and offsets. The filtered acceleration signal is then processed by the microcomputer to determined crash velocity and to perform several acceleration based crash metrics. If any of the crash metrics determined that its associated determined value exceeds its associated threshold value, a deployment signal 50 is output from the microcomputer 34.

The output 50 is connected to the base of a transistor 54. The emitter of the transistor 54 is connected to electrical ground. The collector of the transistor 54 is connected to one terminal of a squib 60. The other terminal of the squib 60 is connected to a source of electrical energy, such as the vehicle battery B+, through a diode 62 in a known manner. A back-up storage capacitor 64 is also connected to the cathode side of the diode 62. The squib 60 is operatively connected to an actuatable restraining device such as an air bag. When the squib is energized, the restraining device is actuated. In the case of an air bag, the air bag is deployed as is well known in the art.

The output 50 of the microcomputer 34 is typically a digital LOW which keeps transistor 54 in an OFF condition.

When a crash metric performed by the microcomputer determines that the air bag should be deployed, the output 50 is switched to a digital HIGH which turns transistor 54 ON. When transistor 54 is ON, a sufficient current for a sufficient time period is passed through the squib to ignite the squib. Ignition of the squib results in ignition of the air bag inflator and/or piercing of a pressurized fluid source resulting in deployment of the air bag.

In accordance with the present invention, four metrics are performed on the filtered acceleration signal 42. The metrics and their associated threshold values are adapted using empirical testing techniques so that both non-deployment events and deployment events are properly identified by the metrics and their associated thresholds, using as a basis predetermined crash events for a particular vehicle platform of interest.

Before any of the metrics are performed, a determination of crash velocity 70 is first made. The acceleration signal 42 is smoothed through a low pass filtered 72. The low pass filter 72 reduces noise levels on the velocity signal on line 42. This filtering is also required for a smoother threshold table indexing explained below.

The output of the low pass filter 72 is integrated by an integration function 74. The integration function 74 is digitally high pass filtered 76 resulting in a velocity value 78. The high pass filter 76 is a return-to-zero function adapted to return the output value of the integrator 74 to zero should the crash velocity return to zero for a predetermined time period. This high pass filter 76 prevents inadvertent deployment as a result of accumulated past events. That is, the digital high pass filter 76 returns the integrated acceleration value, i.e., the velocity value, to zero within a predetermined time after the acceleration value goes to zero. In accordance with a preferred embodiment of the present invention, the time constant of the high pass filter 76 is 150 msec. It is contemplated that any one several algorithms can be used to return the integrated value back to zero. One such algorithm subtracts a percentage value of the then determined total value from the total value.

The output 78 of the high pass filter 76 is connected to a velocity index table 77 which is used to index, size, and normalize the determined velocity value. Specifically, the output 78 of the velocity determining circuit 70 is connected to a summing circuit 79 which sums a calibration parameter 81 with the velocity signal 78. This calibration parameter ensures that the velocity 78 is greater than a predetermined minimum value before further processing is performed. The resultant summation value from the summing circuit 79 is divided by a sizing index 82 that controls the size of the velocity value. Those skilled in the art will appreciate that the size of a value stored in a digital register of a microcomputer must be limited in size so as to fit in the register. The sized velocity value is connected to a normalization circuit 83 which normalizes the velocity value and prevents a negative velocity index value from occurring. The output 84 of the velocity table index circuit 77 is referred to herein as the "normalized velocity value." The velocity value 84 is zero until the velocity value 78 is greater than a minimum value controlled by the index value 81.

A first crash metric determines an acceleration value referred to herein as AMAXF. The AMAXF value is determined by digitally low pass filtering the acceleration signal 42 using a low pass filter 80. The purpose of low pass filter 80 is to band-limit the acceleration signal so as to reduce mechanical noise on the acceleration signal. This insures that the AMAXF value is smoothly varying with respect to time. Preferably, the low pass filter 80 is a three stage cascaded filter with poles located at 76 Hz. The output of the low pass filter 80 is the AMAXF value. The AMAXF value is compared against a threshold value 88 using a comparing function 90 of the microcomputer 34.

The threshold value 88 is velocity based meaning that the value of the threshold value 88 varies as a function of the normalized velocity value 84. This functional relationship between the threshold value 88 and determined normalized velocity value 84 is empirically determined for a particular vehicle platform of interest so as to achieve desired deployment of the restraint. The initial value 88 is set relatively high to prevent inadvertent deployment.

A second crash metric determines a value equal to the acceleration value 42 squared. This crash metric value is referred to herein as ASQ. ASQ is determined by squaring 94 the value of the acceleration signal 42. The squared acceleration value is low pass filtered 96 to achieve a smoothly varying ASQ value with respect to time. This filtering reduces the possibility of inadvertent deployment from mechanical or electrical noise on the acceleration signal.

The ASQ value is compared against a threshold value 98 using a comparing function 100 of the microcomputer 34. The threshold value 98 is also velocity based meaning that the value of the threshold value 98 varies as a function of the determined normalized velocity value 84. This functional relationship between the threshold value 98 and determined normalized velocity value is empirically determined for a particular vehicle platform of interest so as to achieve a desired deployment of the restraint. The initial value of 98 is set relatively high to prevent inadvertent deployment. The value of ASQ is indicative of the crash violence.

A third crash metric determines a value equal to the sum of the squared acceleration value ASQ over a time. This sum of the squared values is referred to herein as ASUM. This ASUM value is determined by summing function 104 the output signal ASQ from the low pass filter 96. The sum of the squares is then high pass filtered 108 to achieve the ASUM value. The high pass filter 108 is a return-to-zero filter having a time constat less than the time constant of the high pass filter 76. The high pass filter 108 prevents inadvertent deployment as a result of accumulated past events. That is, the value output from the summing function 104 is returned-to-zero within a predetermined time after the ASQ value 42 goes to zero.

The ASUM value is compared against a threshold value 112 using a comparing function 116 of the microcomputer 34. The threshold value 112 is velocity based meaning that the value of the threshold value 112 varies as a function of the determined normalized velocity value 84. This functional relationship between the threshold value and determined velocity is empirically determined for a particular vehicle platform of interest so as to achieve desired deployment of the restraint. The initial value 112 is set relatively high to prevent inadvertent deployment. The value ASUM is also indicative of the crash violence.

Those skilled in the art will appreciate that by having the thresholds 88, 98, 112 initially at relatively high values and by using the index value 81, the velocity 78 functions as a safing function. In effect, the velocity value 78 must be greater than a predetermined minimum value before AMAXF, ASQ, or ASUM can exceed their associated threshold values.

The fourth crash metric performed, in accordance with the present invention, is referred to as the shape determination 120. The acceleration signal 42 is connected to a lower limit checking function 124 and an upper limit checking function 125 through a low pass filter 136. The low pass filter 136 heavily filters the acceleration signal 42 so as to limit the signal bandwidth and provide noise reduction. In accordance with one embodiment of the present invention, the filter 136 is either a two or three pole filter with cutoffs at 35–76 Hz.

The lower limit checking function 124 determines if the filtered acceleration signal 42 is greater than a predetermined lower limit value. If the determination is positive, i.e., the value of the acceleration is greater than the predetermined lower limit value, a digital HIGH is output to one input of an AND function 146.

The upper limit check function 125 determines if the value of the filtered acceleration signal is less than a predetermined upper limit value. If the value of the filter acceleration signal 42 is less than the upper limit determined in 125, a digital HIGH is output to one input of an OR function 126.

The acceleration signal 42 is also connected to a slope checking function 140 through the low pass filter 136. The slope checking function 140 monitors the filtered acceleration signal to determine if the slope of the filtered acceleration signal, i.e., the time derivative of the filtered acceleration signal, is greater than a predetermined value. If the slope of the filtered acceleration signal is greater than a predetermined value, the slope checking function 140 outputs a digital HIGH to one input of an AND function 132.

The slope check circuit checks for a single slope value to reach a predetermined value. The velocity limits as well as the slope checking value for deployment and non-deployment crash conditions are empirically determined.

A second lower limit checking function 127 is connected to the output of low pass filter 136. As with lower limit check 124, the lower limit check 127 outputs a digital HIGH to AND function 132 when the value of the filtered acceleration signal is greater than a predetermined lower limit value used by the checking function 127.

The filtered velocity signal 78 output from the high pass filter 76 is connected to a lower limit checking function 141 that determines if the value of the filtered velocity signal 78 is greater than a predetermined minimum or lower limit value. If the velocity value 78 is greater than the predetermined lower limit value, a digital HIGH is output to one input of an AND function 146.

The upper limit circuit 142 is also connected to the filtered velocity signal 78 to determine if the value of the filtered velocity signal 78 is less than a predetermined maximum or upper limit value. If the velocity value 78 is less than the predetermined maximum value, a digital HIGH is output to one input of the AND function 146.

A timer circuit 144 is connected to the output of the AND function 146. When the output of the AND function 146 is a digital HIGH and stays HIGH for a predetermined time period timed out by the timer circuit 144, the timer circuit outputs a digital HIGH. During a zero degree barrier event, the velocity value will typically exceed the upper limit 142 before the timer 144 times out or the acceleration value will exceed its upper limit 125 before the timer times out. However, during a soft deployment event, the velocity and acceleration values typically remain with their windows for a predetermined length of time.

The output of the timer circuit 144 is connected to one input of the AND function 132 and one input of the OR function 126. When the timer circuit is triggered by the output of AND function 146 being HIGH for a predetermined time period, the timer circuit 144 outputs a digital HIGH for a predetermined time period. In effect, the timer circuit 144 outputs a digital HIGH when the value of the determined velocity value 78 is between the upper 142 and lower 141 velocity limits and the value of the acceleration is between the upper 125 and lower 124 acceleration limits for a predetermined time period.

The filtered velocity 78 is also connected to a lower limit checking function 145. The lower limit checking function monitors that the velocity value is greater than a predetermined minimum. If the velocity value is greater than the minimum value set in 145, a digital HIGH is output to ANDing function 132.

The outputs of the timer 144, the lower limit checking function 145, the lower limit checking function 127, and the slope checking function 140 are connected to an AND function 132. When the outputs of the timer 144, the lower limit checking function 145, the lower limit checking function 127, and the slope checking function 140 are all a digital HIGH (or digital true), the output of the AND function 132 is a digital HIGH. Those skilled in the art will appreciate that the lower limit checking function acts as a velocity safing function for the shape metric.

The outputs from the comparing function 90, the comparing function 100, the comparing function 116, and the AND function 132 are connected to an OR function 150. If any of the outputs from the comparing function 90, the comparing function 100, the comparing function 116, and the AND function 132 is at a digital HIGH condition, the output of the OR function 150 will be a digital HIGH. The output of the OR function 150 is operatively connected to the base of the transistor 54. When a digital HIGH is applied to the base of transistor 54 by the OR function 150 (the output 50 of the microcomputer 34), the transistor 54 is turned ON and the squib 60 is energized which, in turn, actuates the occupant restraint device. Those skilled in the art will appreciate that the energization circuit could include a series connected inertia switch to function as a safing sensor. Such an arrangement using a series connected inertia switch as a safing sensor is known in the art.

It should be appreciated by those skilled in the art that the preferred embodiment of the present invention performs four metrics on the acceleration signal, any one of which can control actuation of the occupant restraint device. Three of the crash metrics compare their determined values against velocity dependent threshold values. These three metrics are AMAXF (a value directly proportional to the crash acceleration), ASQ (a value proportional to the square of the crash acceleration), and ASUM (a value proportion to the sum of the squares of the crash acceleration). The fourth crash metric monitors the shape of the crash velocity over a predetermined time period.

Figure 2:
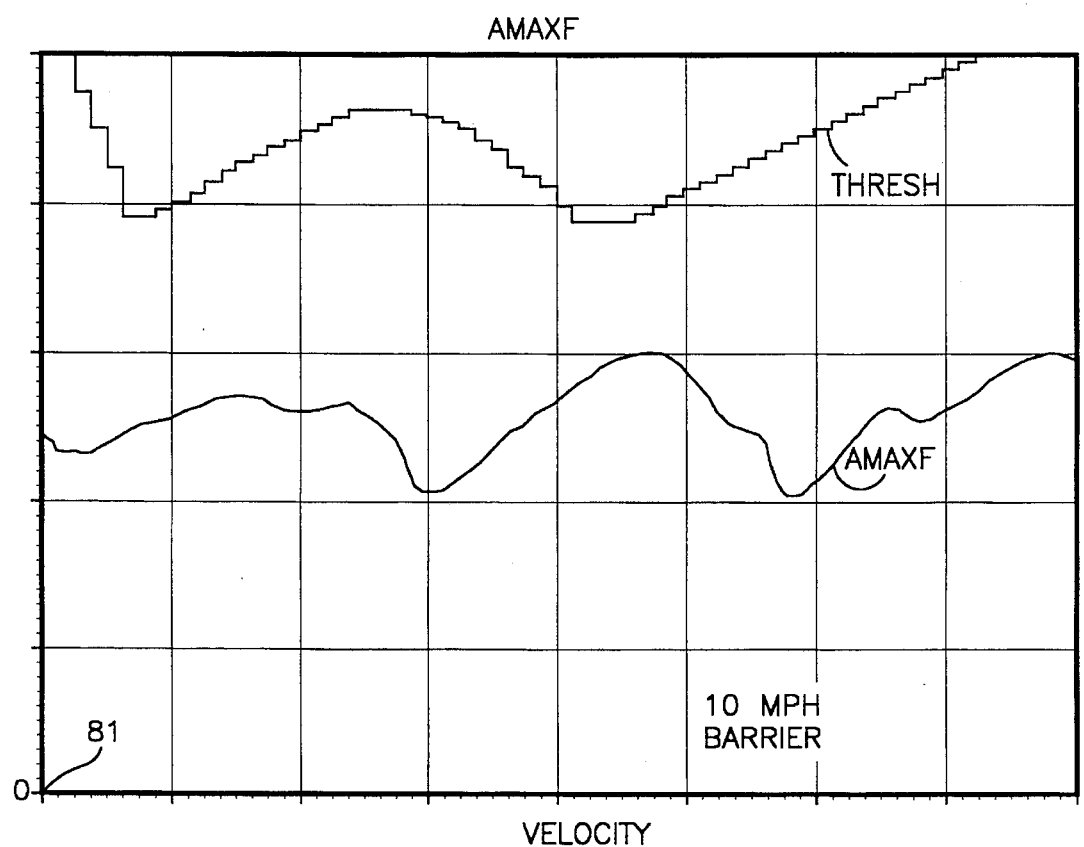
FIGS. 2–4 are graphs illustrating determined values of various crash metrics of the present invention during a non-deployment crash condition.
Figure 3:
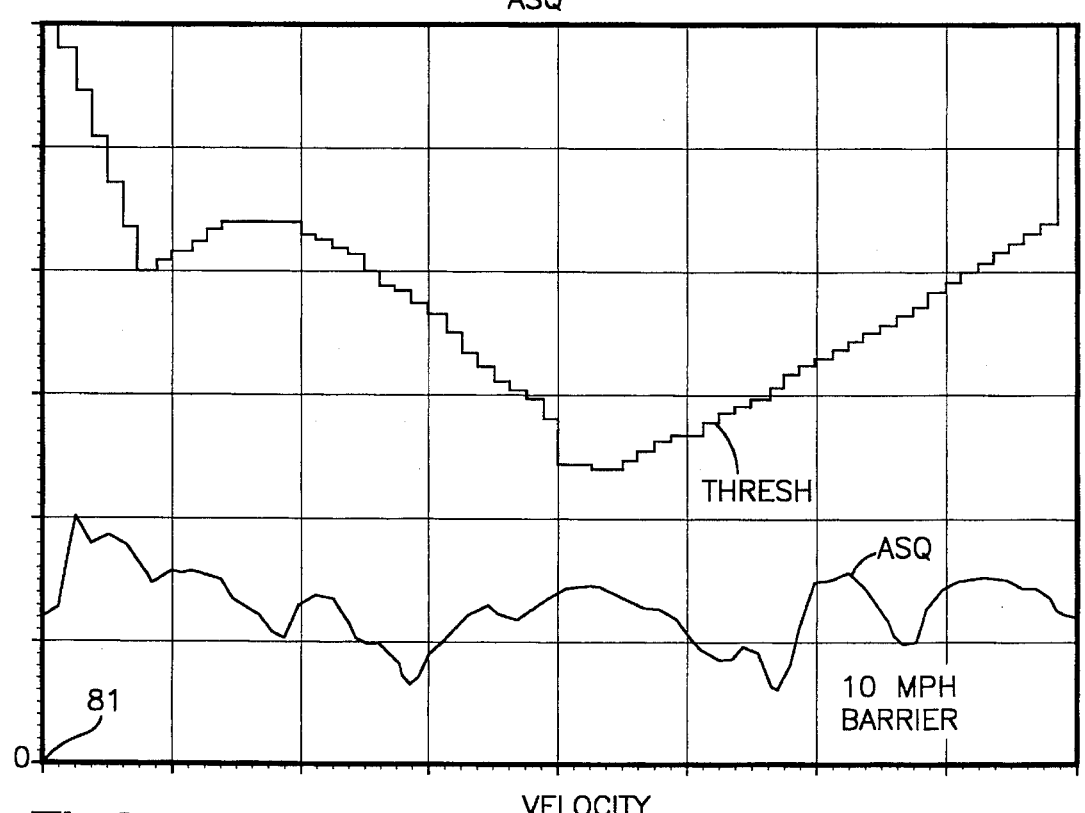

Referring to FIG. 2, the value of AMAXF is shown as a function of crash velocity for a vehicle crashed into a barrier at 10 MPH. At no time during the crash event does the value of AMAXF exceed its associated threshold value 88. The threshold value 88 varies as a function of the crash normalized velocity value 84. The functional relationship between AMAXF and crash velocity is empirically determined to permit distinction between deployment and non-deployment crash conditions. Referring to FIG. 3, the value of ASQ is shown as a function of crash velocity for a vehicle crashed into a barrier at 10 MPH. At no time during the crash event does the value of ASQ exceed its associated threshold value 98. The threshold value 98 varies as a function of the crash normalized velocity value 84. The functional relationship between ASQ and crash velocity is empirically determined to permit distinction between deployment and non-deployment crash conditions.

Figure 4:
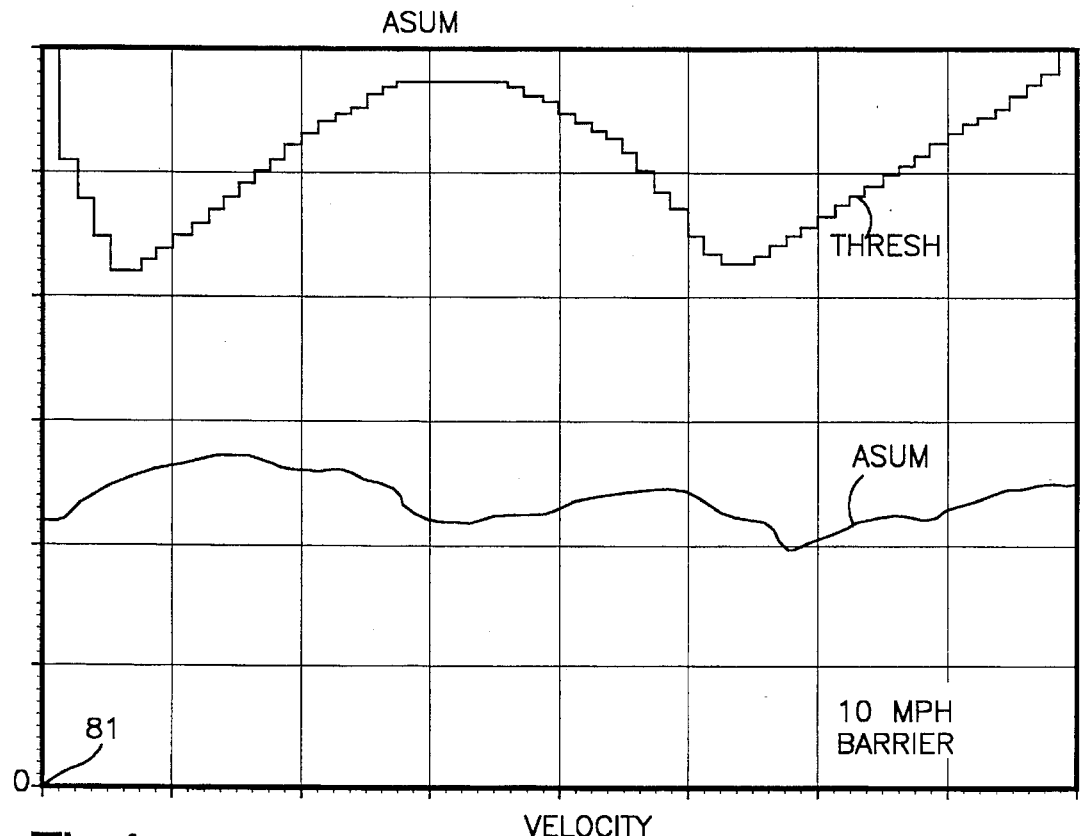

Referring to FIG. 4, the value of ASUM is shown as a function of crash velocity for a vehicle crashed into a barrier at 10 MPH. At no time during the crash event does the value of ASUM exceed its associated threshold value 112. The threshold value 112 varies as a function of the crash normalized velocity value 84. The functional relationship between ASUM and crash velocity is empirically determined over time to permit distinction between deployment and non-deployment crash conditions.

Figure 5:
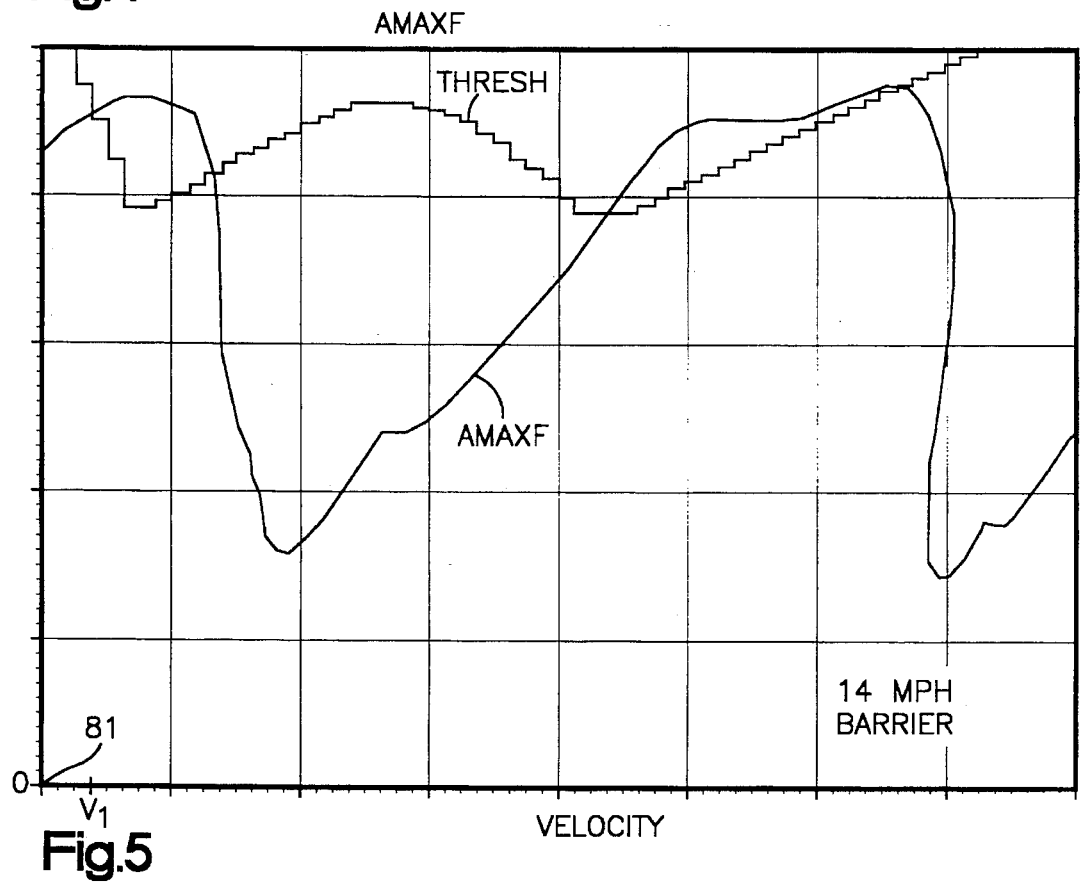
FIGS. 5–7 are graphs illustrating determined values of various crash metrics of the present invention during a deployment crash condition.

Referring to FIG. 5, the value of AMAXF is shown as a function of crash velocity for a vehicle crashed into a barrier at 14 MPH. At a velocity value of $V_1$, the value of AMAXF exceeds its associated threshold value 88. At this point in the crash event, the output of comparator 90 would switch to a HIGH and the restraint device would be actuated.

Figure 6:
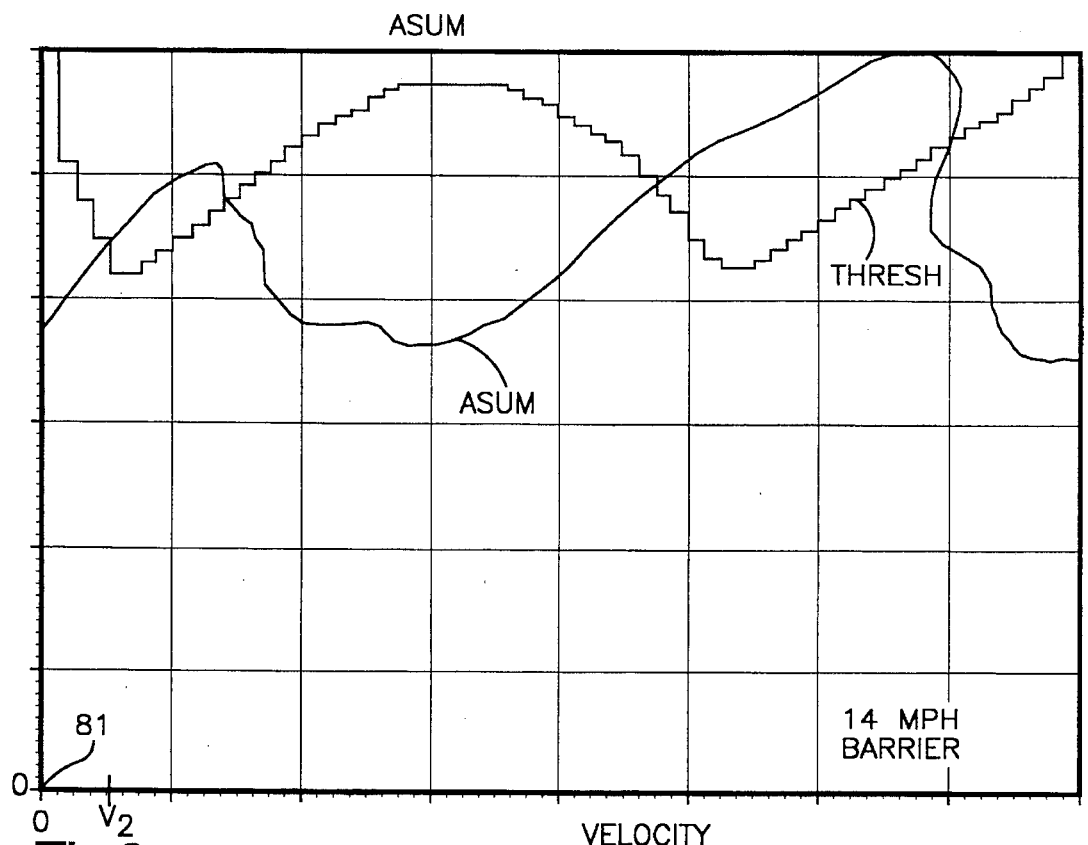

Referring to FIG. 6, the value of ASUM is shown as a function of crash velocity for a vehicle crashed into a barrier at 14 MPH. At a velocity value of $V_2$, the value of ASUM exceeds its associated threshold value 98. At this point during the crash event, the output of comparator 116 would switch to a HIGH and the restraint device would be actuated.

Figure 7:
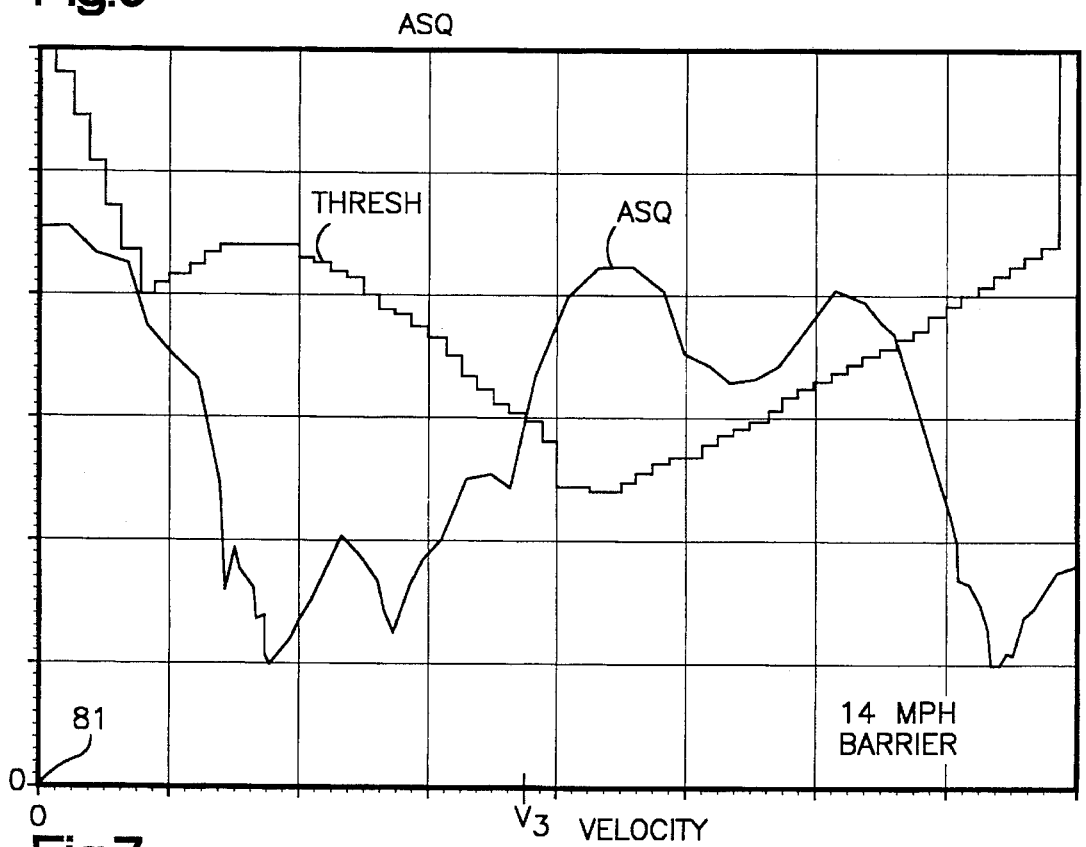

Referring to FIG. 7, the value of ASQ is shown as a function of crash velocity for a vehicle crashed into a barrier at 14 MPH. At approximately a velocity value of $V_3$, the value of ASQ exceeds its associated threshold value 112. At this point during the crash event, the output of comparator 100 would switch to a HIGH and the restraint device would be actuated.

With the AMAXF, ASQ, and ASUM crash metrics ORed, the crash metric that first "catches" the deployment crash condition would control actuation of the restraining device. In the example shown in FIGS. 5–7, AMAXF first detects the deployment crash event when the velocity value is at approximately $V_1$. Therefore, the actuatable restraint would be actuated at this point during the crash event when the velocity value is approximately $V_1$.

Figure 8:
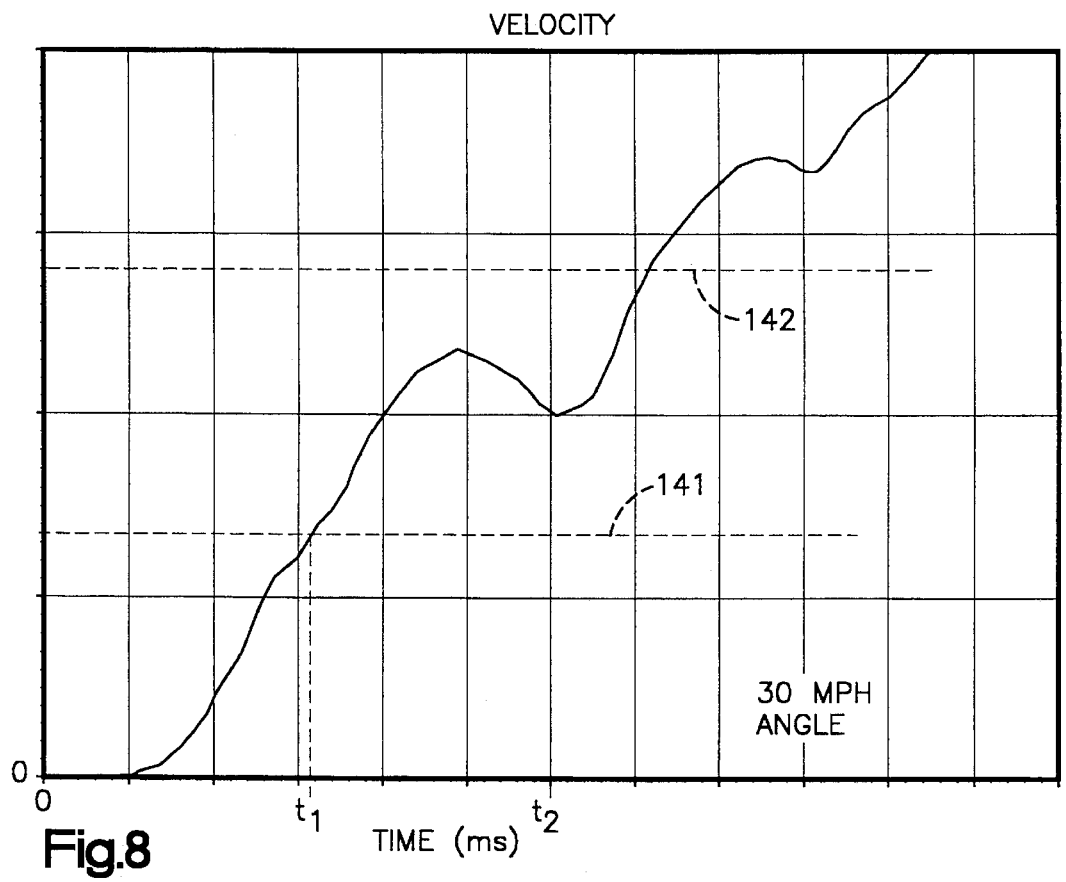
FIG. 8 is a graph illustrating a determined parameter value of the present invention.
Figure 9:
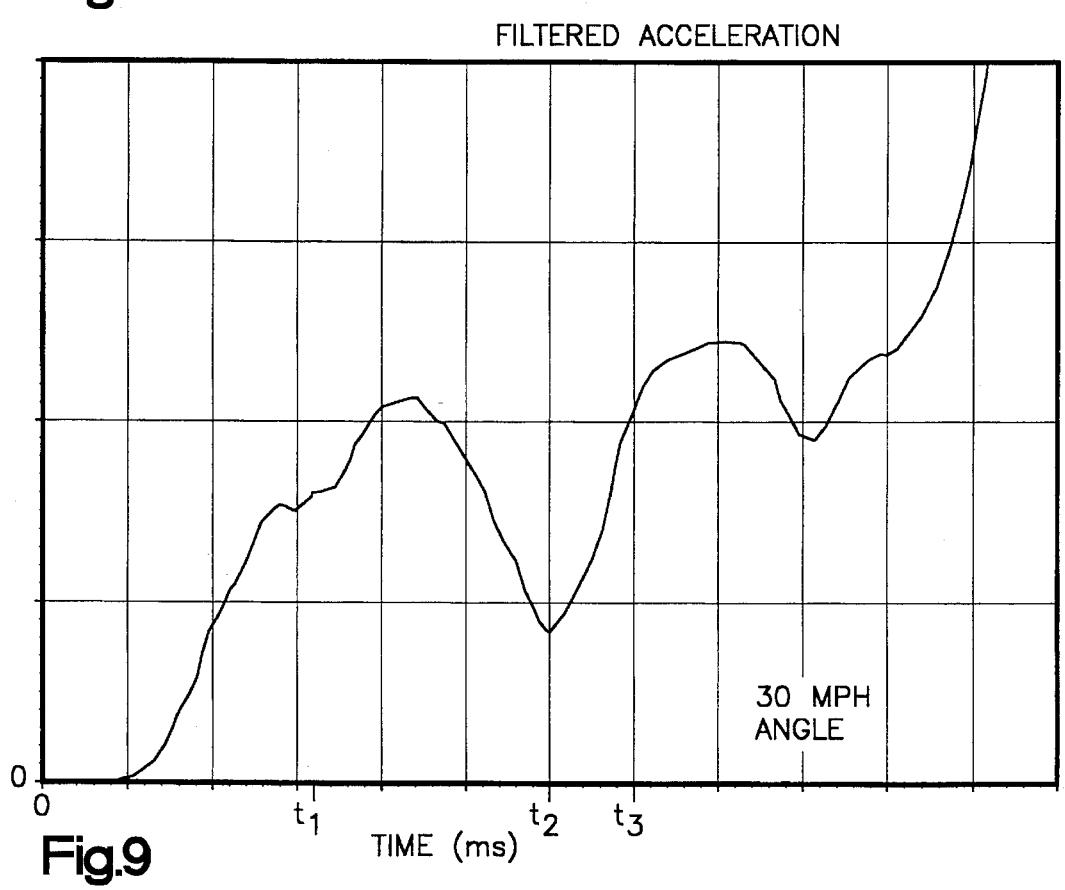
FIG. 9 is a graph illustrating an acceleration signal used by the present invention.

FIGS. 8 and 9 illustrate the shape determining value for a 30 MPH barrier crash at a 30 degree angle. At time $t_1$ into the crash event, the velocity value 78 is greater than the lower limit value 141 and less than the upper limit value 142. At time $t_1$, the timer 144 starts to time out.

When the velocity value remains within the window of 141, 142 and the timer times out at $t_2$, the output of the timer 144 then switches to a digital HIGH. Starting at time $t_2$, a HIGH from the slope checking function 140 would result in a HIGH out of ANDing function 132 (this assumes that the acceleration is already above the lower limit checked in 127 and the velocity is above its lower limit check 145). In FIG. 9, between times $t_2$ and $t_3$, the slope is great enough to result in a HIGH from slope checking function 140. Between times $t_2$ and $t_3$, the restraint would be actuated.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing a vehicle crash condition comprising:

acceleration sensing means for sensing a vehicle crash condition and for providing a crash acceleration signal having a characteristic indicative of the vehicle crash condition;

crash velocity determining means connected to said acceleration sensing means for determining a crash velocity value from said crash acceleration signal;

crash metric determining means connected to said acceleration sensing means for determining a crash metric value functionally related to said acceleration signal;

threshold determining means for determining a velocity based threshold value functionally related to said determined crash velocity value, said velocity based threshold value varying as a function of said determined crash velocity value;

comparing means for comparing said determined crash metric value against said velocity based threshold value and for providing a signal indicative of the comparison; and control signal means for providing a control signal in response to said comparing means when said determined crash metric exceeds said velocity based threshold value.

2. The apparatus of claim 1 wherein said crash metric determining means includes means for determining a band-limited value functionally related to the value of the crash acceleration signal.

3. The apparatus of claim 1 wherein said crash metric determining means includes means for determining a value functionally related to crash violence.

4. The apparatus of claim 3 wherein said crash metric determining means includes means for determining a value functionally related to the square of the crash acceleration signal.

5. The apparatus of claim 3 wherein said crash metric determining means includes means for determining a value functionally related to the sum of the squares of the crash acceleration signal.

6. An apparatus for sensing a vehicle crash condition comprising:

acceleration sensing means for sensing a vehicle crash condition and for providing a crash acceleration signal having a characteristic indicative of the vehicle crash condition;

crash velocity determining means connected to said acceleration sensing means for determining crash velocity value from said a crash acceleration signal;

a plurality of crash metric determining means connected to said acceleration sensing means, each crash metric determining means determining a crash metric value functionally related to said crash acceleration signal;

a plurality of velocity based threshold determining means, each crash metric having an associated velocity based threshold determining means, each threshold determining means determining its associated velocity based threshold value functionally related to said determined crash velocity value so that each of said velocity based threshold values varies as a function of said determined crash velocity value;

comparing means for comparing each of said determined crash metric value against its associated velocity based threshold value and for providing a signal indicative of the comparison; and control signal means for providing a control signal in response to any of said determined crash metrics exceeding its associated velocity based threshold value.

7. The apparatus of claim 6 wherein said crash metric determining means includes means for determining a band-limited value functionally related to the value of the crash acceleration signal.

8. The apparatus of claim 6 wherein said crash metric determining means includes means for determining a value functionally related to crash violence.

9. The apparatus of claim 8 wherein said crash metric determining means includes means for determining a value functionally related to the square of the crash acceleration signal.

10. The apparatus of claim 8 wherein said crash metric determining means includes means for determining a value functionally related to the sum of the squares of the crash acceleration signal.

11. An apparatus for sensing a vehicle crash condition comprising:

acceleration sensing means for sensing a vehicle crash condition and for providing an acceleration signal having a characteristic indicative of the vehicle crash condition;

crash velocity determining means connected to said acceleration sensing means for determining a crash velocity value from said acceleration signal;

first crash metric determining means connected to said acceleration sensing means for determining a value proportional to said acceleration signal;

first crash metric threshold determining means associated with said first crash metric determining means for determining a first velocity based threshold value functionally related to said determined crash velocity value;

second crash metric determining means connected to said acceleration sensing means for determining a value proportional to said acceleration signal squared;

second crash metric threshold determining means associated with said second crash metric determining means for determining a second velocity based threshold value functionally related to said determined crash velocity value;

third crash metric determining means connected to said acceleration sensing means for determining a value proportional to a sum of said acceleration signal squared;

third crash metric threshold determining means associated with said third crash metric determining means for determining a third velocity based threshold value functionally related to said determined crash velocity value;

fourth crash metric determining means connected to said acceleration sensing means for determining a value proportional to a shape of said acceleration signal;

shape comparing means for comparing said crash metric shape against a predetermined shape;

comparing means for comparing each of said determined crash metric values against its associated velocity based threshold value and for providing a signal indicative of the comparison; and control signal means for providing a control signal in response to any of said determined crash metrics exceeding its associated velocity based threshold value as indicated by said comparing means or said compared shape is equal to said predetermined shape.

12. An apparatus for sensing a vehicle crash condition comprising:

acceleration sensing means for sensing a vehicle crash condition and for providing a crash acceleration signal having a characteristic indicative of the vehicle crash condition;

crash velocity determining means connected to said acceleration sensing means for determining crash velocity value from said crash acceleration signal;

crash metric determining means connected to said acceleration sensing means for determining a crash metric value functionally related to said crash acceleration signal, said value being indicative of a type of crash event; and control signal means for providing a control signal in response to (i) said determined crash velocity value being greater than a predetermined value and (ii) said crash metric value indicating that a deployment crash event is occurring.

13. A method for sensing a vehicle crash condition, said method comprising the steps of:

sensing a vehicle crash condition and providing a crash acceleration signal having a characteristic indicative of the vehicle crash deceleration;

determining a crash velocity value from said crash acceleration signal;

determining a plurality of crash metric values functionally related to said crash acceleration signal;

determining an associated velocity based threshold value for each crash metric, each determined velocity based threshold value being functionally related to said determined crash velocity value so that each of said determined velocity based threshold values varies as a function of said determined crash velocity value;

comparing each of said determined crash metric values against its associated velocity based threshold value and providing a signal indicative of the comparison; and providing a control signal in response to any of said determined crash metrics exceeding its associated velocity based threshold value.

14. The method of claim 13 wherein said step of determining a crash metric value includes determining a band-limit value functionally related to the value of the crash acceleration signal.

15. The method of claim 13 wherein said step of determining a crash metric includes determining a value functionally related to crash violence.

16. The method of claim 15 wherein said step of determining a crash metric includes determining a value functionally related to the square of the crash acceleration signal.

17. The apparatus of claim 15 wherein said step of determining a crash metric includes determining a value functionally related to the sum of the squares of the crash acceleration signal.

18. An apparatus for sensing a vehicle crash condition comprising:

acceleration sensing means for sensing a vehicle crash condition and for providing a crash acceleration signal having a characteristic indicative of the vehicle crash condition;

crash velocity determining means connected to said acceleration sensing means for determining a crash velocity value from said crash acceleration signal;

a plurality of crash metric determining means connected to said acceleration sensing mean, each crash metric determining means determining a crash metric value functionally related to said crash acceleration signal;

means for determining the shape of the crash acceleration signal as a function of time;

a plurality of velocity based threshold determining means, each crash metric having an associated velocity based threshold determining means, each threshold determining means determining its associated velocity based threshold value functionally related to said determined crash velocity value;

comparing means for comparing each of said determined crash metric value against its associated velocity based threshold value and for providing a signal indicative of the comparison; and control signal means for providing a control signal in response to any of said determined crash metrics exceeding its associated velocity based threshold value and for providing said control signal if said determined shape of said crash acceleration signal is equal to a predetermined shape.

19. A method for sensing a vehicle crash condition, said method comprising the steps of:

sensing a vehicle crash condition and providing a crash acceleration signal having a characteristic indicative of the vehicle crash deceleration;

determining a crash velocity value from said crash acceleration signal;

determining a plurality of crash metric values functionally related to said crash acceleration signal;

determining an associated velocity based threshold value for each crash metric, each determined velocity based threshold value being functionally related to said determined crash velocity value;

determining the shape of the crash acceleration signal as a function of time;

comparing each of said determined crash metric values against its associated velocity based threshold value and providing a signal indicative of the comparison; and providing a control signal in response to any of said determined crash metrics exceeding its associated velocity based threshold value and providing said control signal if said determined shape of said crash acceleration signal is equal to a predetermined shape.

* * * * *